United States Patent [19]

Flatau

[11] 4,408,015

[45] Oct. 4, 1983

[54] PRODUCTION OF POLYVINYL CHLORIDE AND ACRYLATE COPOLYMER MODIFIER USEFUL FOR HIGH-SPEED CALENDAR MANUFACTURE OF SHEET STOCK

[75] Inventor: Karsten Flatau, Haltern, Fed. Rep. of Germany

[73] Assignee: Chemische Werke Huls Aktiengesellschaft, Marl, Fed. Rep. of Germany

[21] Appl. No.: 349,946

[22] Filed: Feb. 18, 1982

[30] Foreign Application Priority Data

Feb. 18, 1981 [DE]  Fed. Rep. of Germany ....... 3105817

[51] Int. Cl.³ .................. C08L 33/12; C08L 27/06
[52] U.S. Cl. .................. 525/227; 525/198; 524/523
[58] Field of Search ................ 525/227, 198

[56]  References Cited
U.S. PATENT DOCUMENTS 3,652,727  3/1972  Yonezu et al.
3,720,761  3/1973  Hunter, Jr.
3,867,481  2/1975  Whang ..................... 525/227
3,882,198  5/1975  Miller ..................... 525/227
3,919,137  11/1975  Dyer et al. ................ 260/928
3,925,510  12/1975  Ide et al. ................. 260/876
3,991,135  11/1976  Kraft et al. ............... 525/227

Primary Examiner—Carman J. Seccuro
Attorney, Agent, or Firm—Millen & White

[57]  ABSTRACT

Modified polyvinyl chloride is produced by suspension polymerization in the presence of monomersoluble catalysts and conventional protective colloids. After polymerization, there is added to the polymerized mixture, 0.1 to 3% by weight, based on the amount of polyvinyl chloride of the latex of a copolymer of 75–95% by weight of methyl methacrylate, 0–20% by weight of styrene, and 5–25% by weight of an acrylic acid ester of 4–8 carbon atoms in the alcohol component. Precipitation of the latex is then effected under continued agitation. Precipitation can be accomplished, for example, thermally or using coagulants. The thus-modified suspension polymer is subsequently obtained by ordinary removal by filtration and drying.

6 Claims, No Drawings

PRODUCTION OF POLYVINYL CHLORIDE AND ACRYLATE COPOLYMER MODIFIER USEFUL FOR HIGH-SPEED CALENDAR MANUFACTURE OF SHEET STOCK

BACKGROUND OF THE INVENTION

Vinyl chloride polymers possess poor flow properties, low stability under dynamic processing conditions, are difficult to shape, and present difficulties when attempts are made to flow or melt them.

In converting vinyl chloride polymers into molded articles, the polymer powder is generally mixed with various additives, e.g. auxiliary processing media, such as stabilizers, lubricants (mold release agents), pigments, and fillers, depending on the properties to be imparted to the composition. The powder (compound) is heated to melt it into a homogeneous or gelled mass. For reasons of economy alone, it is desirable to keep such a heat treatment as brief as possible, i.e. it is desirable to process a polymeric material that melts or gels rapidly. Thus, the aim is for vinyl chloride polymers to be processable at high speed in order to attain high output rates with high-speed processing machines. The high-speed processing must not impair properties such as mechanical strength, transparency, and surface characteristics. Since unmodified polyvinyl chloride is not rapidly processable, it is necessary to add auxiliary processing media to the polyvinyl chloride composition.

Processes for improving the processing properties of polyvinyl chloride are conventional. For example, it is known to add, to the finished polyvinyl chloride, copolymers of vinyl chloride with other monomers, other polymers, e.g. acrylonitrile-styrene copolymers, methyl methacrylate-styrene copolymers, and also graft copolymers of a quite specific structure (DAS's [German Published Applications] Nos. 2,414,561 and 1,952,839).

However, blending polyvinyl chloride with other polymers requires an additional working step for the processor and necessitates keeping a separate store of modifier.

The mentioned graft copolymers of complicated structure (DAS's Nos. 2,414,561; 2,363,564; and 1,952,839), which must be blended with the polyvinyl chloride composition prior to the desired processing, can be produced only with great technical expenditure.

Also, the incorporation of aqueous additive mixture dispersions (DOS [German Unexamined Laid-Open Application] No. 2,709,404) does not provide the processor with any marked advance in the art, since the water contained in the dispersion must be vaporized out of the molding composition later, with considerable extra expenditure.

The polymerization of vinyl chloride up to a conversion of 60-80%, subsequent removal of the unreacted vinyl chloride, addition of methyl methacrylate, and subsequent methacrylate polymerization are technically unsatisfactory (DOS No. 2,422,688). Large amounts of return (unreacted) VC are obtained; unreacted methyl methacrylate must be removed from the cycle. Moreover, the modifier content is very high (35-65%). The products are blended for processing with unmodified polyvinyl chloride, which necessitates an additional operating step with the extra expenditure connected therewith.

The subsequent metered feeding of a comonomer (DAS No. 1,795,390) at a specific conversion requires an accurate determination of the conversion as well as expensive regulating and metering devices. Moreover, it means that, for example, for each percent of introduced vinyl acetate, the softening point of the homopolymer/copolymer mixture drops by 0.5° C. (DOS No. 2,606,934). Although vinyl chloride-ethylene copolymers possess improved processability, just as vinyl chloride-propene copolymers, this is also attained at the cost of a lowered thermal deformation temperature. Additionally, the control of the reaction is difficult, since monomeric propene is a degrading chain transfer agent and slows down the reaction velocity.

Consequently, the production of modified PVC which can be processed at high speeds into sheet stock, for example on calenders, is difficult from the viewpoints of copolymer production, homo-copolymer mixtures required, and the required separate production of graft copolymers; and/or it represents additional expenditure in apparatus and time for the processor.

SUMMARY OF THE INVENTION

Accordingly, it is an object of this invention to provide a process which ameliorates or overcomes the foregoing disadvantages.

Upon further study of the specification and appended claims, further objects and advantages of this invention will become apparent to those skilled in the art.

These objects have been attained by this invention by providing a process for the production of polyvinyl chloride by suspension polymerization in the presence of monomer-soluble catalysts and conventional protective colloids as suspension stabilizers, the process comprising adding, after the polymerization, the latex of a copolymer consisting essentially of 75-95% by weight of methyl methacrylate, 0-20% by weight of styrene, and 5-25% by weight of an acrylic acid ester of 4-8 carbon atoms in the alcohol moiety, wherein the percent by weight adds up to 100%, in a quantity of 0.1-3% by weight of copolymer, based on the amount of polyvinyl chloride; effecting precipitation of the latex under continued agitation; and, subsequently, obtaining the thus-modified suspension polymer by customary removal by filtration and drying.

DETAILED DISCUSSION

In one suitable version of the process of this invention, the precipitation of the latex is accomplished using conventional coagulants in fully conventional fashion. See, e.g., Kainer, Polyvinylchlorid und Vinylchlorid-Mischpolymerisate, Springer-Verlag, Berlin/Göttingen/Heidelberg (1952), pages 52/53, whose disclosure is incorporated by reference herein. In a preferred embodiment of the process of this invention, the precipitation of the latex is effected thermally by maintaining the polymer mixture, after adding the latex, under continued agitation for 1-60 minutes at a temperature of 50°-90° C.

Subsequently, the thus-modified suspension polymer is obtained by customary removal by filtration and drying. See, e.g., Krekeler-Wick, Polyvinylchlorid, Volume II part 1, Carl Hauser Verlag Müchen (1963), page 46, last paragraph, whose disclosure is incorporated by reference herein.

The polyvinyl chloride produced by this invention can be utilized with special advantages for the manufacture of sheet stock on high-speed calenders.

The suspension polymerization of the vinyl chloride is carried out in the presence of conventional monomersoluble catalysts, in conventional fashion, e.g. those from the groups of the diacyl, dialkyl, or aroyl peroxides, e.g. diacetyl, dibenzoyl, dilauroyl, 2,4-dichlorobenzoyl peroxide; of the peroxydicarbonates, such as diisopropyl, dicyclohexyl, di-tert-butylcyclohexyl, diethylcyclohexyl, dimyristyl, dicetyl, distearyl peroxydicarbonate; of the peresters, such as isopropyl, tert-butyl peracetate, tert-butyl peroctoate, tert-butyl perpivalate, tert-butyl, isoamyl perneodecanoate; of the mixed anhydrides or organic sulfoperacids and organic acids, such as, for example, acetylcyclohexylsulfonyl peroxide; of the azo compounds, such as, for example, azobisisobutyronitrile and azibisdimethylvalerylodinitrile. The catalysts can be utilized in amounts from 0.01–0.3% by weight, based on the amount of vinyl chloride monomer.

Furthermore, the suspension polymerization can be carried out in the presence of one or several protective colloids, such as, for example, partially saponified polyvinyl acetates, cellulose derivatives, such as water-soluble methylcellulose, carboxymethylcellulose, hydroxyethylcellulose, methylhydroxypropylcellulose, as well as gelatin; furthermore suitable are polyalkylene oxides or copolymers of maleic acid and/or its monoesters and styrenes. The amount of protective colloids employed can be 0.01–1% by weight, preferably 0.05–0.4% by weight.

Furthermore, the polymerization can be effected in the presence of 0.01–5% by weight, based on the amount of monomers, of cosuspension agents which are used in admixture with the above-mentioned protective colloids. Suitable cosuspension agents include, for example: partial fatty acid esters of polyhydric alcohols, such as glycerin monostearate, sorbitan monolaurate, -oleate, or -palmitate, polyoxyethylene ethers of fatty alcohols or aromatic hydroxy compounds; polyoxyethylene esters of fatty acids, polypropylene oxide-polyethylene oxide condensation products, as well as partially saponified polyvinyl acetates having a degree of saponification of about 30–50 mol-%.

The polymerization temperature of the suspension polymerization will generally be 30°–70° C. The resultant suspension polymers have K-values of 50–70, preferably 55–65.

Agitation can be carried out with conventional impeller agitators.

The suspension polymerization can also be conducted in the presence of lubricants (mold release agents) for polyvinyl chloride, e.g. secondary fatty acid products (e.g. dicarboxylic acid esters of fatty alcohols), secondary wax acid products (e.g. montanic acid esters or partially saponified montanic acid esters), as well as hydrocarbon waxes (e.g. polyethylene waxes). Usually, 0.05–1.5% by weight, preferably 0.1–1.0% by weight of lubricant based on the amount of monomer, is added to the polymerization batch at the beginning.

Unless indicated otherwise herein, the suspension polymerization is fully conventional as described, e.g., in Helmuth Kainer, Polyvinylchlorid und Vinylchlorid-Mischpolymerisate, Springer-Verlag, Berlin/Heidelberg/New York, (1965), pages 12 to 34, whose disclosures are incorporated by reference herein.

After the suspension polymerization has been completed, and before or after the pressure drop in the polymerization reactor, 0.1–3.0% by weight, preferably 0.5–1.5% by weight, of a copolymer in latex form is added. This copolymer comprises 75–95% by weight of methyl methacrylate, 0–20% by weight of styrene, and 5–25% by weight of an acrylic acid ester of 4–8 carbon atoms in the alcohol moiety, wherein the indicated percent by weight adds up to 100%.

It is, furthermore, advantageous if the added copolymer consists essentially of 80–90% by weight of methyl methacrylate, 5–10% by weight of styrene, and 5–10% by weight of an acrylic acid ester of 4–8 carbon atoms in the alcohol moiety.

The alcohol is usually a $C_{4-8}$-branched or straight chain alkanol. Suitable acrylic acid esters with 4–8 carbon atoms in the alcohol moiety are acrylic acid n-butyl ester, acrylic acid n-hexyl ester, acrylic acid n-octyl ester, or acrylic acid 2-ethyl-hexyl ester.

It is especially advantageous if the acrylic acid ester of the copolymer is an acrylic acid butyl ester or an acrylic acid 2-ethylhexyl ester.

The copolymer latex is prepared by conventional emulsion polymerization. Suitable catalysts include all water-soluble free radical catalysts customary in emulsion polymerization, e.g. persulfates, such as potassium, sodium, or ammonium persulfate; hydrogen peroxide, tert-butyl hydroperoxide, Na perborate, K percarbonate, or other water-soluble peroxides, as well as corresponding mixtures thereof. Peroxidic catalysts can also be employed in the presence of 0.01–1% by weight, based on the amount of monomers, of one or more reducing compounds suitable for establishing a redox catalyst system, such as, for example, sulfites, bisulfites, dithionites, thiosulfates, aldehyde sulfoxylates, e.g. formaldehyde sulfoxylate, etc.

In general, about 0.075–0.1% by weight, based on the weight of the monomers, of catalyst or redox system is required.

Furthermore, the emulsion polymerization can be conducted in the presence of 0.01–5% by weight, based on the amount of monomer, of one or several emulsifiers. Suitable emulsifiers include anionic, amphoteric, cationic, as well as nonionic emulsifiers. Examples of suitable anionic emulsifiers include: alkali metal, alkaline earth metal, or ammonium salts of fatty acids, such as lauric, palmitic, or stearic acid; of acidic fatty alcohol sulfuric acid esters; of paraffin sulfonic acids; of alkylaryl sulfonic acids, such as dodecylbenzene- or dibutylnaphthalenesulfonic acid; of sulfosuccinic acid dialkyl esters; as well as the alkali metal and ammonium salts of fatty acids which contain epoxy groups, e.g. epoxystearic acid. Examples of amphoteric or cationic emulsifiers include: alkyl betaines, such as dodecylbetaine, as well as alkyl pyridinium salts, such as lauryl pyridinium hydrochloride; furthermore, also alkyl ammonium salts, such as oxyethyldodecylammonium chloride. Examples of nonionic emulsifiers include: partial fatty acid esters of polyhydric alcohols, such as glycerin monostearate, sorbitan monolaurate, -oleate, or -palmitate; polyoxyethylene ethers of fatty alcohols or aromatic hydroxy compounds; polyoxyethylene esters of fatty acids, as well as polypropylene oxide-polyethylene oxide condensation products.

The emulsion polymerization is effected at conventional temperatures of 30°–90° C., preferably 60°–70° C., and usual pressures by batch or continuous-feed procedures, wherein a portion of the monomers is charged and the remainder is subsequently added in metered amounts.

The emulsion polymerization is conducted under fully conventional conditions, e.g., as described in Helmuth Kainer, Polyvinylchlorid und Vinylchlorid-Mischpolymerisate, Springer-Verlag, Berlin/Heidelberg/New York, (1965), pages 34 to 59, whose disclosure is incorporated by reference herein.

In a further preferred embodiment of the process, 0.1–0.3% by weight, based on the amount of polyvinyl chloride, of a conventional external lubricant (mold release agent) is added simultaneously with the latex of the copolymer. That is, besides the methyl methacrylate copolymer latex, an additive dispersion, e.g. a lubricant dispersion, can be added to the suspension polymer at the same time, separately or in admixture with the methacrylate copolymer dispersion. At this time, the lubricant can also be added in the solid form to the mixture of PVC suspension and copolymer latex using amounts of 0.05–1.5%, preferably 0.1–1.5%.

Suitable lubricants include: secondary fatty acid products such as, for example, dicarboxylic acid esters of fatty alcohols, secondary wax acid products, such as, for example, montanic acid esters or partially saponified montanic acid esters, and hydrocarbon waxes, e.g. polyethylene waxes.

The suspension-latex mixture is first thoroughly mixed. This mixture can be stirred using the agitating equipment and at the agitating speeds customary in suspension polymerization at temperatures of 50°–90° C., preferably 65°–85° C. for a time period of 1–60 minutes, preferably 20–45 minutes. This step effects uniform precipitation of the copolymer on the suspension polyvinyl chloride. Prolonged agitation at 50°–90° C. does not improve the result. Simultaneously with the agitation of the suspension-latex mixture at 50°–90° C., it is possible to conduct the reactor degasification for VC recovery, which customarily follows the polymerization.

The precipitation of the copolymer latex on the suspension polyvinyl chloride can also be carried out using coagulants. Examples of suitable coagulants include salts, such as sodium chloride or calcium chloride.

The suspended, modified polyvinyl chloride can be conventionally isolated by means of the processing methods customary for suspension polyvinyl chloride, i.e. by filtration or centrifuging, and can thereafter be conventionally dried.

The advantages attained by this invention derive from the fact that the process provides a technically simple manufacture of modified polyvinyl chloride, which melts rapidly and thus can be readily processed on high-speed calenders. "Melts rapidly" means short periods for plastification and a small maximal moment of torsion when tested in the Brabender plasticorder.

The aforementioned problems in the production of rapidly processable polyvinyl chloride compositions, the preparation of graft copolymers as the modifiers, the blending of polymers, etc., can thus be circumvented in a simple way.

The polyvinyl chloride compositions of this invention possess the melting properties required for easy, rapid processability. The products can be worked on high-speed calenders into transparent sheet stock free of flow marks at high take-off speeds (e.g., >40 m/min, when the sheet has 150 $\mu$m thickness, >25 m/min, when the sheet has 300 $\mu$m thickness, >15 m/min, when the sheet has 500 $\mu$m thickness) and good processing width (e.g., processable on a 4-roller-calender, chromium-plated or not chromium-plated, or on 5-roller-calender with a diameter of the rolls up to 600 mm, to thin sheets <150 $\mu$m and thick sheets >400 $\mu$m; there is no adhering on the calender, the sheet being able to be rapidly taken off from the calender without becoming turbid). The sheet stock can readily be deep-drawn in the presence of auxiliary processing agents, such as MBS (methylmethacrylic-butadienestyrene-copolymers).

The products exhibit excellent quick-flow characteristics, (i.e. high take-off speeds). They show great processing breadth, no tackiness, (i.e. the do not adhere at the calender in spite of the high take-off speeds) smooth masticating (kneading) behavior, and low gel (fisheye) number which could be reduced to 66%.

They are suitable for the production of glass-clear sheet stock and pigmented sheet stock.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The process of this invention and the resultant product properties will be explained in the following examples and tables.

PRODUCTION OF MODIFIER LATEX

A 685-liter polymerization reactor was charged with 337.25 kg of water, 225 g of potassium persulfate, and 525 g of 20% alkanesulfonate. Via two feed lines, in one, a monomer mixture of 120.0 kg of methyl methacrylate, 15 kg of 2-ethylhexyl acrylate, and 15 kg of styrene and, in the other, 12 l of 7.8% strength alkanesulfonate solution, were uniformly introduced into the receiver within 6 hours. After a total reaction time of 8 hours at 60° C., a 30% latex was obtained.

Vinyl Chloride Suspension Polymerization

A 150-liter stainless steel autoclave, equipped with impeller agitator, was charged with 57.3 kg of fully demineralized water, 40 kg of vinyl chloride, 0.1% of methylhydroxypropylcellulose, 0.05% of hydroxypropylcellulose, 0.03% of sorbitan monolaurate, 0.1% of dilauroyl peroxide, and 0.05% of dicetyl peroxydicarbonate. The percentage values are referred to the amount of vinyl chloride employed. After heating to 67° C., with an agitator speed of 180 rpm, polymerization was conducted within 6 hours to a conversion of 90%. The thus-obtained polyvinyl chloride suspension was utilized for the following coagulation test.

Production of Modified Polyvinyl Chloride

After termination of polymerization, while maintaining the polymerization temperature, the above-described (meth)acrylate copolymer dispersion (1.5% copolymer solid, based on PVC) containing 0.2% (based on PVC) of an external lubricant dispersed therein, was introduced into the previously described polyvinyl chloride suspension.

The suspension-dispersion mixture was mixed for one hour at 67° C. and then maintained at 85° C. for one hour to precipitate the dispersed latex particles onto the PVC grain. The thus-modified polyvinyl chloride was vacuum-filtered and dried.

The improvements obtained by the process of this invention are apparent from a determination of the melt viscosity, the plasticizing time, and the roll take-off speed (Tables 1–3).

Melt Viscosity and Rolling Characteristic

The modified polyvinyl chloride (100 parts by weight) produced as set forth above was homogenized with 1.5 parts by weight of stabilizer and further processed on a roll into a homogeneous melt and into a rough sheet. The following rolling conditions were set:

| | |
|---|---|
| nip width | = 0.4 mm |
| friction | = 1:1.2 (22.5:27 sec$^{-1}$) |
| temperature | = 190° C. (in the mass) |
| rolling period | = 5 minutes per rough sheet |

The maximum roll-separating force $W_{max}$ and the roll-separating force $W_{end}$ at the end of the rolling step were determined (Table 1).

TABLE 1

| Product | $W_{max}$[N] | $W_{end}$[N] |
|---|---|---|
| Unmodified PVC | 3650 | 3375 |
| PVC Modified According to Invention | 3050 | 2800 |

The $W_{max}$ and $W_{end}$ values reflect the viscosity-lowering effect of the modification according to this invention.

TABLE 2

Measurement in High-Pressure Capillary Rheometer at 190° C.

| | $\eta$/Pas/ at $\gamma$ = ... sec$^-$ | | | |
|---|---|---|---|---|
| Product | 30 | 100 | 1000 | 5000 |
| Unmodified PVC | 9470 | 4250 | 750 | 187 |
| Modified According to Invention | 8250 | 3820 | 682 | 168 |

For purposes of measurement, the rolled sheets produced at 190° C. were comminuted and extruded at 190° C.

The calendering behavior is characterized by indicating the beginning of turbidity and tendency to blocking (tackiness) (Table 3). The point of turbidity is understood to be the take-off speed at which the sheet at a specific temperature program has only a slight turbidity and does not stick to the rolls. The point of turbidity is observed earlier at a lower temperature level and depends on the separating effect of the added lubricant.

TABLE 3

| | Parts by Weight | |
|---|---|---|
| Test | Unmodified PVC | PVC Modified According to Invention |
| Recipe | 100 | 100 |
| "Irgastab"$^{(+)}$ 17 MOK | 1.5 | 1.5 |
| "Loxiol" G 10 | 0.8 | 0.8 |
| "Loxiol" G 20 | 0.2 | 0.2 |
| "Loxiol" G 70 | 0.5 | 0.5 |
| Calendering speed m/min at beginning of turbidity | 7.5 | 12 |

$^{(+)}$an organic Sn-stabilizer made by Ciby-Geigy

The production of sheet stock on high-speed calenders is described in H. Saechtling, "Kunststoff-Taschenbuch" [Plastics Pocketbook] 21st edition (1979), Carl Hauser Publishers, Munich, page 245, which is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing polyvinyl chloride which is processable by high speed calendering comprising suspension polymerizing vinyl chloride in the presence of a monomer-soluble catalyst and a protective colloid as suspension stabilizer; after the polymerization, adding 0.1–3% by weight, based on the amount of polyvinyl chloride of a latex of a copolymer of 75–95% by weight of methyl methacrylate, 0–20% by weight of styrene, and 5–25% by weight of an acrylic acid ester of a $C_{4-8}$-alkanol, the total weight percentage adding up to 100, while agitating the mixture; precipitating the latex onto the polyvinyl chloride while continuing the agitation; and, thereafter, separating the resultant modified suspension polyvinyl chloride by filtration and drying.

2. A process of claim 1, wherein the precipitation of the latex onto the polyvinyl chloride is effected by adding a coagulant.

3. A process of claim 1, wherein the precipitation of the latex onto the polyvinyl chloride is effected thermally by maintaining the polymer mixture, after addition of the latex, at a temperature of 50°–90° C. under continued agitation for 1–60 minutes.

4. A process of claim 1, 2 or 3 wherein the copolymer added is of 80–90% by weight of methyl methacrylate, 5–10% by weight of styrene, and 5–10% by weight of an acrylic acid ester of a $C_{4-8}$ alkanol.

5. A process of claim 1 or 3, wherein the acrylic acid ester of the copolymer is an acrylic acid butyl ester or an acrylic acid 2-ethylhexyl ester.

6. A process of claim 1, wherein 0.1–0.3% by weight, based on the amount of polyvinyl chloride, of a mold lubricant is added simultaneously with the latex of the copolymer.

* * * * *